United States Patent [19]
Tan

[11] 3,983,499
[45] Sept. 28, 1976

[54] MULTI-PHASE PSK DEMODULATOR
[75] Inventor: Yoichi Tan, Tokyo, Japan
[73] Assignee: Nippon Electric Company, Ltd., Tokyo, Japan
[22] Filed: Sept. 24, 1975
[21] Appl. No.: 616,462

[30] Foreign Application Priority Data
Sept. 25, 1974 Japan............................ 49-110293

[52] U.S. Cl................................. 329/112; 329/104; 325/320; 331/12; 331/14
[51] Int. Cl.[2]......................................... H03D 3/00
[58] Field of Search ............... 178/88; 325/30, 163, 325/320, 419; 329/104, 107, 112; 331/12

[56] References Cited
UNITED STATES PATENTS 3,878,475   4/1975   Okano et al. ...................... 329/112
3,924,197   12/1975   Okano et al. ...................... 331/12

Primary Examiner—John Kominski
Attorney, Agent, or Firm—Sughrue, Rothwell, Mion, Zinn and Macpeak

[57] ABSTRACT

A synchronized carrier recovery circuit for a PSK modulated signal includes a plurality of phase detectors supplied with the PSK input signal and phase shifted outputs from a voltage controlled oscillator. The detector outputs are rectified and alternately coupled to a pair of adders whose outputs feed a complimentary subtractor. The detector outputs are also converted to digital form and fed to an Exclusive OR circuit, whose output couples the appropriate subtractor outputs to the VCO to achieve phase locked synchronization.

4 Claims, 2 Drawing Figures

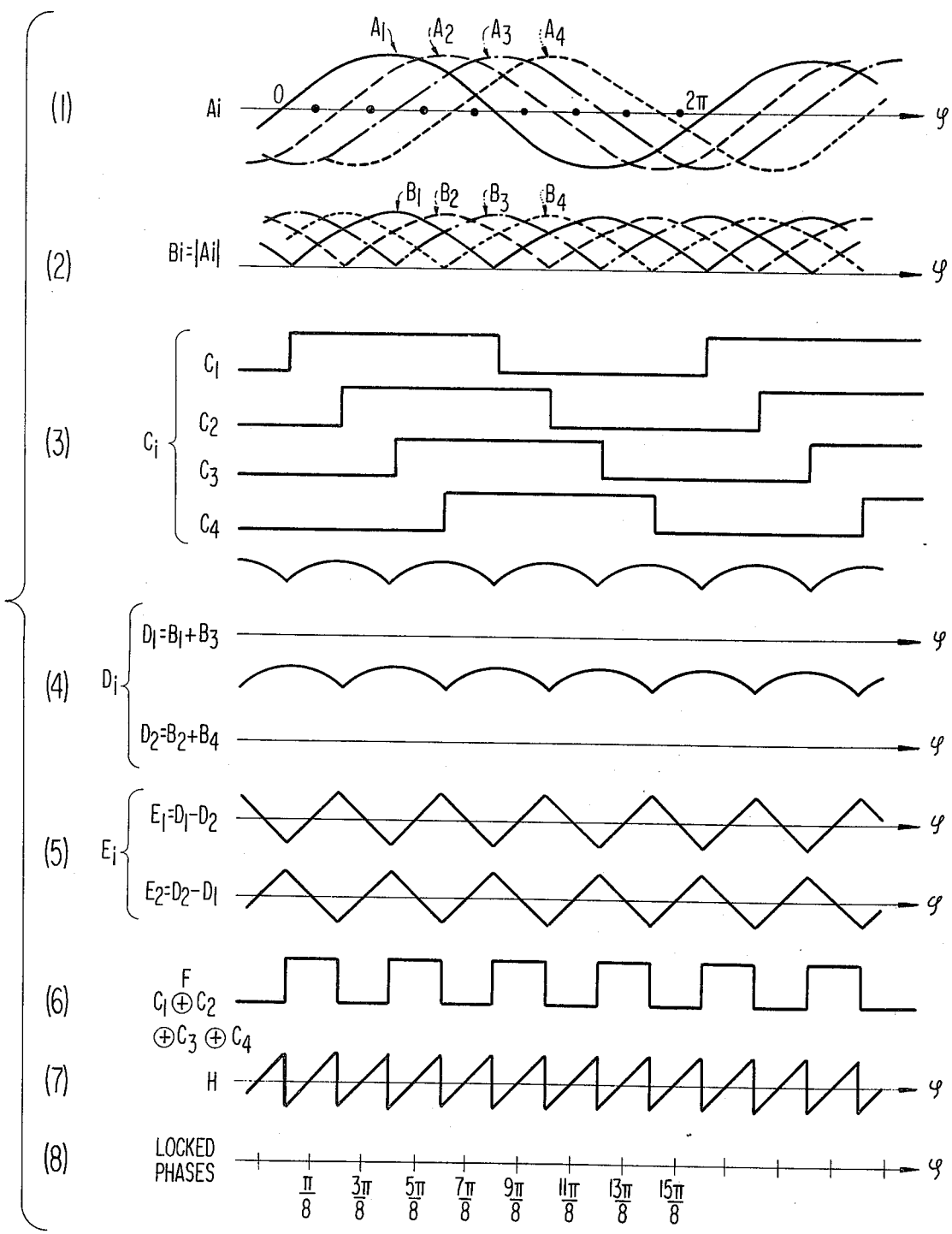

MULTI-PHASE PSK DEMODULATOR

BACKGROUND OF THE INVENTION

1. Field of the Invention

This invention relates to a multi-phase PSK (phase-shift-keying) demodulator, particularly adapted for use in multiplexed PSK transmissions of digital signals.

2. Description of the Prior Art

Conventional techniques for recovering a synchronized carrier wave from a PSK-modulated carrier wave for demodulation include reverse modulation, frequency multiplication, the Costas loop system, and the like.

In the reverse modulation technique, a received PSK-modulated carrier wave is demodulated with the output of a voltage-controlled oscillator (VCO) used as a reference, and the demodulation output is caused to reverse-modulate the PSK-modulated carrier wave so as to provide an unmodulated carrier wave for demodulation. The unmodulated carrier wave is phase-compared with the output of the VCO for the automatic frequency control thereof. Thus, the VCO output is kept synchronized with the PSK-modulated carrier wave, so that the synchronized VCO output is used as the synchronized carrier wave for demodulation.

Since such a system does not compensate for phase variations at the phase detector, the reverse modulator, and the like, the output waveform of the phase detector may deteriorate, thus increasing the error rate and adversely affecting the synchronization. Furthermore, with an increase in the number of prefixed signal phases available to PSK, the construction of the reverse demodulator becomes quite complicated.

In the frequency multiplication technique, the PSK-modulated carrier wave is frequency-multiplied by a number equal to the number of phases present. The frequency multiplying signal and the VCO output signal are phase-compared by a phase comparator, whose output is fed to the VCO to control the oscillation frequency. The phase-controlled VCO output is then frequency-divided, and the PSK-modulated carrier wave is synchronized with the frequency-divided output. According to this technique, phase variations at the frequency multiplier, frequency-divider, and the like, adversely affect synchronization. In addition, with an increase in the number of discrete phases, the frequency multiplier and frequency divider become increasingly complicated. Furthermore, these conventional techniques require the use of complicated signal processing circuitry in the high frequency band.

The Costas loop system is designed to avoid the aforesaid shortcomings. For details of its structure and function, reference is made to the Article entitled "Synchronous Communications", in the Proceedings of the IRE, VOL. 44, No. 12, pp. 1713–1718, December Edition, 1959. However, this system is not free from shortcomings in that it requires a stabilized DC amplifier and twice as many phase detectors as the above-mentioned techniques.

Among these three conventional techniques, reverse modulation is most often used because of its relative simplicity.

SUMMARY OF THE INVENTION

It is an object of the present invention to avoid the aforesaid shortcomings of the conventional carrier wave reproduction systems, and to provide a stable and economical multi-phase PSK demodulator circuit.

According to the present invention, there is provided an $n$-phase PSK demodulator ($n$ being equal to the $m$-th power of 2, and $n$ and $m$ being integers equal to or larger than 3) comprising a voltage controlled oscillator, $n/2$ phase-detectors for comparing an incoming PSK-modulated input signal with the output of the oscillator to provide phase-difference-representing signals, $n/2$ phase-shifters connected respectively to the output of the oscillator and the inputs of the $n/2$ phase-detectors for shifting the phase of said oscillator output by $$\frac{2K\pi}{n} \text{radian} (K = 0, 1, 2, \ldots, \frac{n}{2}-1) ,$$

$n/2$ absolute-value detecting circuits for converting the phase-difference-representing signals into absolute values, means for extracting from the outputs of the absolute-value detecting circuits phase error signals mutually phase-displaced by $2\pi/n$ radian, analogue-to-digital converters for converting the phase detector outputs and synthesizing the converted signals, and gate means for controllably switching the error signal providing means in response to the synthesized signal so that the error signal is selectively fed to the oscillator.

BRIEF DESCRIPTION OF THE DRAWINGS

In the drawings:

FIG. 2 shows the waveforms obtained at the outputs of the structural elements of FIG. 1.

DESCRIPTION OF THE PREFERRED EMBODIMENTS

Figure 1:
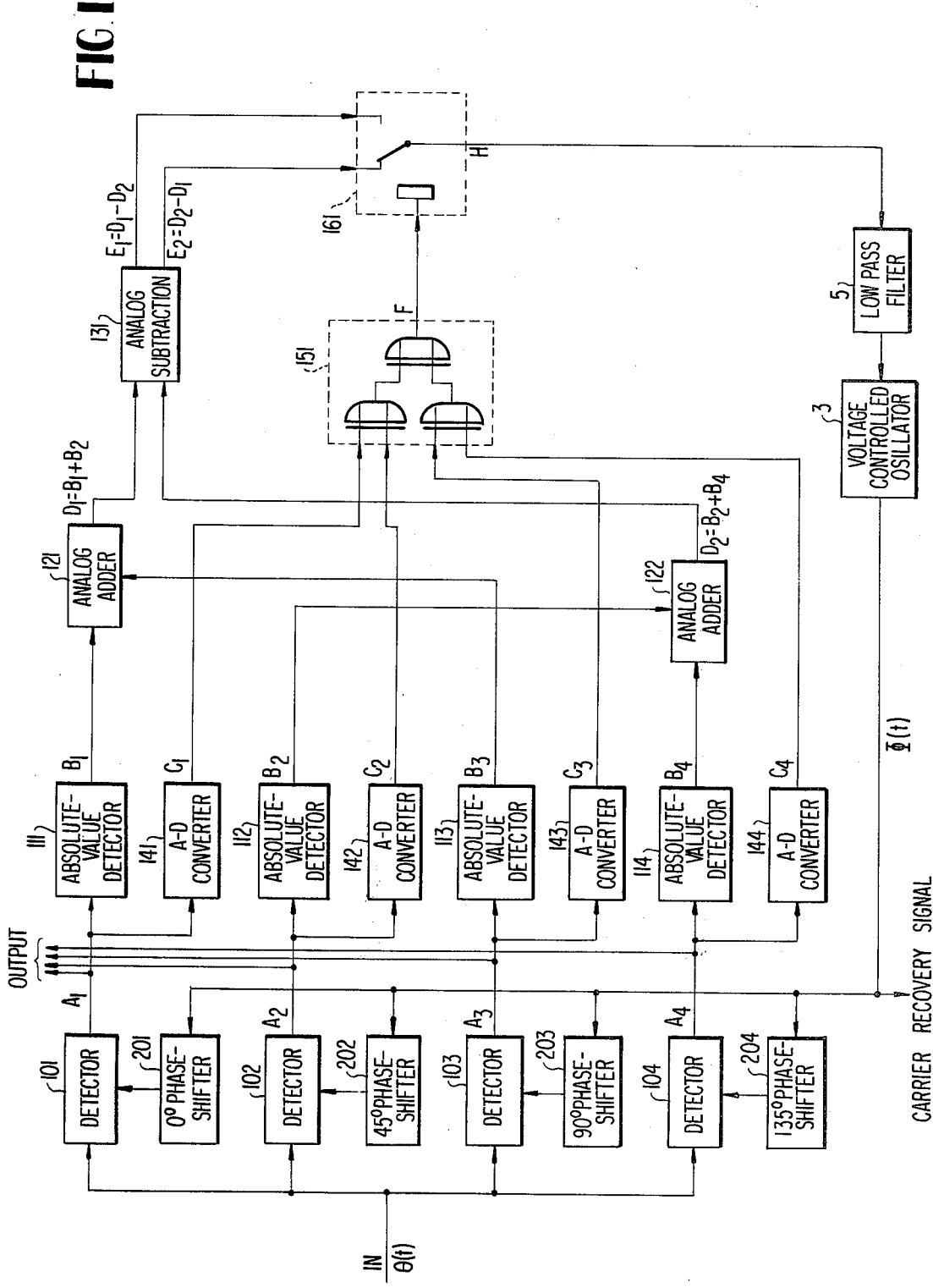
FIG. 1 is a circuit diagram of an eight-phase PSK demodulator circuit according to the present invention.

Referring to FIG. 1, reference numerals 101 to 104 denote phase detectors; 111 to 114 designate absolute value detecting circuits; 121 and 122 are analogue adders; 131 is an analogue subtractor; 141 to 144 are analogue-to-digital (A–D) converters; 151 is an Exclusive OR circuit; 161 identifies a switching circuit; 201 to 204 denote phase shifters of 0, $\pi/4$, $2\pi/4$, $3\pi/4$; 5 is a low pass filter; and 3 is a voltage controlled oscillator (VCO). Each of these structural elements are well known in the art and will not be described in detail herein.

In the embodiment of FIG. 1, an eight-phase PSK input signal is fed in parallel to phase detectors 101 to 104. The output of the voltage controlled oscillator 3 is phase-shifted by 0, $\pi/4$, $2\pi/4$, $3\pi/4$ by phase shifters 201 to 204, whose outputs are also fed to the phase detectors 101 to 104, respectively. The outputs of the phase detectors are fed to the absolute value detecting circuits 111 to 114, each of which may consist of a full-wave rectifying circuit, so that the absolute value of the input signal is detected. The outputs of the detecting circuits 111 and 113 are fed to an analogue adder 121 consisting, for instance, of a hybrid resistor network. Similarly, the outputs of circuits 112 and 114 are fed to another analogue adder 122. The summation outputs of these analogue adders 121 and 122 are then fed to an analogue subtractor 131, which may consist of a differential amplifier.

The outputs A1 to A4 of the phase detectors 101 to 104 have waveforms as shown in FIG. 2(1), with the phase difference $\phi$ given between the PSK input signal and the output from the oscillator 3. When the demodulator is in a phase-synchronized state, the demodulated outputs A1 to A4 from the phase detectors 101 to 104 have the respective locked phases $$\frac{2n-1}{8}\pi \ (n = 1, 2, \ldots 8),$$

as shown in FIG. 2(8). The outputs B1 to B4 of the full wave rectifying circuits 111 to 114 vary at varying phase differences $\phi$ in a manner as shown in FIG. 2(2). Accordingly, the outputs $D_1$ and $D_2$ of the adders 121 and 122 are waveforms as shown in FIG. 2(4). In addition, the outputs $D_1$ and $D_2$ give waveforms $E_1$ and $E_2$ as shown in FIG. 2(5) by the subtractor 131. In the synchronized state as shown in FIG. 2(8), outputs E1 and E2 add up to zero (equal and opposite in phase), but when the phase $\phi$ is shifted or synchronization is lost, the outputs E1, E2 will be of a different relative polarity to each other and their sum will have an absolute value not always equal to zero. The phases $\phi$ are thus brought into a synchronized state by controlling the frequency of the oscillator 3 in response to the outputs E1 and E2. However, if the oscillator 3 is controlled to have a value in the neighborhood of a point where the output E1 crosses the zero voltage level, the control characteristic of the oscillator 3 is of a convergent nature in a certain range in a direction toward the zero level (for instance, in a range from 0 to $\pi/4$), while the above characteristic is of a divergent nature in the range outside it (for instance, in a range from $\pi/4$ to $\pi/2$).

Accordingly, the convergent portions of the outputs E1 and E2 of the subtractor 131 are selectively fed to the oscillator 3 as the frequency control signal, so as to synchronize the oscillator 3 with the input PSK signal. The respective outputs A1 to A4 of the phase detectors 101 to 104 are supplied to the analogue-to-digital (A-D) converters 141 to 144 (consisting, for example, of amplitude comparators), wherein the outputs are converted to a 1 level if the detector output is positive, and to a 0 level if the detector output is negative. As a result, the outputs C1 to C4 of the converters 141 to 144 are as shown in FIG. 2(3). In addition, the outputs C1 to C4 of the converters 141 to 144 are fed to the Exclusive OR circuit 151, so that the Exclusive OR function $C1\oplus C2\oplus C3\oplus C4$ is obtained, whereby the output F is as shown in FIG. 2(6). The switching circuit 161 comprising, for example, well known diode switches, is controlled in response to the output of the Exclusive OR circuit 151 so as to switch the outputs E1, E2 of the subtractor 131. The switched outputs E1 and E2 are fed to the low pass filter 5.

The selection between the outputs E1 and E2 is primarily governed by the variations in the control voltage of the oscillator 3 and varying polarities of the oscillation frequency. For example, if the phase is advanced while the polarity of the control voltage is negative, i.e., if the frequency of the oscillator 3 is increasing, then the switching circuit 161 is switched in such a manner that the output E1 is fed to the filter 5 when the output F of the circuit 151 is 1, while the output E2 is fed to the filter 5 when the output F is 0. This results in the output H as shown in FIG. 2(7), which is fed to the filter 5 from the switching circuit 162. The phase of the oscillating output is thereby shifted in a direction to retard (or advance) the phase from either one of the synchronous conditions, i.e.

$$\frac{2n-1}{8}\pi \ (n = 1, 2, \ldots 8),$$

and the control signal fed to the filter 5 has a negative voltage (or positive voltage) at all times. This causes the oscillator 3 to advance (or retard) the phase to return the system to the initial synchronized state, thereby enabling the phase synchronization.

For simplicity of arrangement, the error signal providing circuit shown is comprised of only adders 121, 122, subtractor 131. Exclusive OR circuit 151 and switching circuit 161. Alternatively, however, the error signal providing circuit may be arranged as described below, although such arrangement is somewhat more complicated than the first-mentioned circuit.

The alternative error providing circuit consists of four subtractors for subtracting the output B1 of the absolute value circuit from B2, B3 from B2, B4 from B3, and B1 from B4, respectively; four switching-circuits connected to the outputs of the subtractors; and four Exclusive OR circuits delivering respective Exclusive OR functions for outputs C1 and C2, C2 and C3, C3 and C4, and C4 and C1 of the A-D converters. The switching circuits connected to the corresponding subtractors are controlled in response to the output signals of the Exclusive OR circuits so that a control signal is fed from the subtractors to the oscillator through the switching circuits.

To generalize the structural elements of the invention, the error signal providing signal circuit may be adapted to an $n$-phase PSK demodulation, where $n$ is an integer equal to or larger than the $m$-th power of 2, $m$ being another integer equal to or larger than 3.

For such an input PSK signal, the error signal providing circuit consists of: the adders having th function of $$A1 + A3 + \ldots + A\frac{n}{2}-1 \ (= D1)$$

and $$A2 + A4 + \ldots + A\frac{n}{2} \ (= D2) ;$$

the subtractors having the function of D1-D2 (=E1) and D2-D1 (=E2); and the Exclusive OR circuit having the function of $$C1 \oplus C2 \oplus \ldots \oplus C\frac{n}{2} \ (= F).$$

The switching circuit is controlled in response to the output signals of the Exclusive OR circuit so that the control signal is fed from the subtractors to the oscillator through the switching circuit.

As has been described, the signal processing in the course of the phase synchronization is carried out in a base band circuit and a digital circuit, thus simplifying the integration of the circuits, facilitating cost reduction and miniaturization, and improving reliability. In addition, the maintenance of synchronization is easier to achieve compared with the conventional techniques, due to the automatic compensation for phase variations in the high frequency circuits without increasing the number of phase detectors and high frequency circuits.

What is claimed is:

1. An $n$-phase PSK demodulator ($n$ being equal to the $m$-th power of 2, with $n$ and $m$ being integers and $m$ equal to or larger than 3) comprising:
   a. a voltage controlled oscillator;
   b. $n/2$ phase-detectors for comparing an incoming PSK-modulated signal with the output signal of said oscillator to provide phase-difference-representing signals;
   c. $n/2$ phase-shifters connected respectively to the output of said oscillator and the inputs of said phase detectors for shifting the phase of said oscillator output by $$\frac{2K\pi}{n} \text{radian} \left(K = 0, 1, 2, \ldots, \frac{n}{2} - 1\right);$$

d. $n/2$ absolute-value detecting circuits for converting the phase-difference-representing signals into absolute values, respectively;
   e. means for extracting from the output signals of said absolute value detecting circuits, phase error signals mutually phase-displaced by $2\pi/n$;
   f. means for analogue-to-digital converting the output signals of said phase detectors and synthesizing the converted signal; and
   g. gate means for controllably switching said error signal producing means in response to said synthesized signal whereby said error signals are selectively fed to said oscillator.

2. A demodulator as recited in claim 1 wherein the means for extracting comprises two adder circuits whose outputs are coupled to a complementary subtractor circuit.

3. A demodulator as recited in claim 1 wherein the means for synthesizing comprises an Exclusive OR circuit.

4. A demodulator as recited in claim 2 wherein the means for synthesizing comprises an Exclusive OR circuit.

* * * * *

UNITED STATES PATENT AND TRADEMARK OFFICE
CERTIFICATE OF CORRECTION

PATENT NO. : 3,983,499
DATED : September 28, 1976
INVENTOR(S) : Yoichi TAN

It is certified that error appears in the above-identified patent and that said Letters Patent are hereby corrected as shown below:

IN THE SPECIFICATION:

Column 4, line 1, delete "162" and insert --161--;

line 16, after "131" delete the period and insert a comma;

line 40, delete "th" and insert --the--;

line 44, delete "$A\frac{n}{2} - 1$" and insert -- $A^{\frac{n}{2} - 1}$ --.

Signed and Sealed this

Seventeenth Day of May 1977

[SEAL]

Attest:

RUTH C. MASON
Attesting Officer

C. MARSHALL DANN
Commissioner of Patents and Trademarks